(12) United States Patent
Jogand-Coulomb

(10) Patent No.: US 8,365,279 B2
(45) Date of Patent: Jan. 29, 2013

(54) STORAGE DEVICE AND METHOD FOR DYNAMIC CONTENT TRACING

(75) Inventor: Fabrice E. Jogand-Coulomb, San Carlos, CA (US)

(73) Assignee: SanDisk Technologies Inc., Plano, TX (US)

( * ) Notice: Subject to any disclaimer, the term of this patent is extended or adjusted under 35 U.S.C. 154(b) by 442 days.

(21) Appl. No.: 12/608,747

(22) Filed: Oct. 29, 2009

(65) Prior Publication Data

US 2010/0115616 A1 May 6, 2010

Related U.S. Application Data

(60) Provisional application No. 61/110,399, filed on Oct. 31, 2008.

(51) Int. Cl.
*G06F 11/00* (2006.01)
*G06F 7/04* (2006.01)
*G06F 11/30* (2006.01)
*H04N 7/167* (2011.01)

(52) U.S. Cl. ............. 726/22; 726/26; 713/193; 380/202

(58) Field of Classification Search .......... 713/164–167, 713/176, 189–190, 192–194; 726/22, 26–33; 380/200–203
See application file for complete search history.

(56) References Cited

U.S. PATENT DOCUMENTS

| | | | |
|---|---|---|---|
| 5,329,618 A | 7/1994 | Moati et al. | |
| 6,009,176 A | 12/1999 | Gennaro et al. | |
| 6,523,114 B1 | 2/2003 | Barton | |
| 6,553,127 B1 * | 4/2003 | Kurowski | 382/100 |
| 6,912,315 B1 | 6/2005 | Wong et al. | |
| 7,738,676 B1 * | 6/2010 | Evans et al. | 382/100 |
| 2001/0001613 A1 | 5/2001 | Hashimoto | |
| 2002/0056118 A1 * | 5/2002 | Hunter et al. | 725/87 |
| 2002/0186842 A1 * | 12/2002 | Sabet-Sharghi et al. | 380/200 |
| 2003/0009669 A1 * | 1/2003 | White et al. | 713/176 |
| 2003/0046238 A1 * | 3/2003 | Nonaka et al. | 705/51 |

(Continued)

FOREIGN PATENT DOCUMENTS

| | | |
|---|---|---|
| EP | 1 014 618 | 6/2000 |
| GB | 2 330 031 | 4/1999 |

(Continued)

OTHER PUBLICATIONS

Willem Jonker, Jean-Paul Linnartz, "Digital Rights Management in Consumer Electronics Products", IEEE Signal Processing Magazine, Special Issue on Digital Rights Management, Mar. 2004, vol. 21, No. 2, pp. 82-91.*

(Continued)

*Primary Examiner* — Darren B Schwartz
(74) *Attorney, Agent, or Firm* — Brinks Hofer Gilson & Lione

(57) ABSTRACT

A storage device and method for dynamic content tracing are provided. In one embodiment, a storage device stores content having a plurality of sequences of data, each sequence of data having original data and at least one variation of the original data. The storage device receives an identifier of a host device and, for each sequence of data, selects either the original data or one of the at least one variation of the original data based on the identifier of the host device. The storage device then assembles a version of the content from the selections and provides the assembled version of the content to the host device. The assembled version of the content is unique to the host device and therefore can be used to trace the assembled version of the content back to the host device.

26 Claims, 5 Drawing Sheets

U.S. PATENT DOCUMENTS

| | | | | |
|---|---|---|---|---|
| 2003/0056101 | A1* | 3/2003 | Epstein | 713/176 |
| 2003/0159043 | A1* | 8/2003 | Epstein | 713/176 |
| 2003/0161473 | A1 | 8/2003 | Fransdonk | |
| 2003/0187674 | A1 | 10/2003 | Odgers et al. | |
| 2003/0190054 | A1* | 10/2003 | Troyansky et al. | 382/100 |
| 2004/0098593 | A1* | 5/2004 | Muratani | 713/176 |
| 2004/0158828 | A1* | 8/2004 | Zimmer et al. | 717/168 |
| 2005/0039022 | A1 | 2/2005 | Venkatesan et al. | |
| 2005/0063540 | A1* | 3/2005 | Hsiung | 380/217 |
| 2005/0097329 | A1* | 5/2005 | Morimoto et al. | 713/176 |
| 2005/0193205 | A1* | 9/2005 | Jacobs et al. | 713/176 |
| 2006/0005029 | A1* | 1/2006 | Petrovic et al. | 713/176 |
| 2006/0095792 | A1* | 5/2006 | Hurtado et al. | 713/189 |
| 2006/0126891 | A1* | 6/2006 | Seroussi et al. | 382/100 |
| 2006/0285687 | A1* | 12/2006 | Kawada et al. | 380/201 |
| 2007/0033419 | A1 | 2/2007 | Kocher et al. | |
| 2007/0047442 | A1* | 3/2007 | Snyder | 370/235 |
| 2007/0053549 | A1* | 3/2007 | Miller et al. | 382/100 |
| 2007/0067242 | A1* | 3/2007 | Lotspiech et al. | 705/57 |
| 2007/0220266 | A1* | 9/2007 | Cooper et al. | 713/176 |
| 2007/0283448 | A1* | 12/2007 | Green | 726/28 |
| 2008/0130886 | A1 | 6/2008 | Kocher et al. | |
| 2008/0133938 | A1 | 6/2008 | Kocher et al. | |
| 2008/0250120 | A1* | 10/2008 | Mick et al. | 709/219 |
| 2009/0049558 | A1* | 2/2009 | Lotspiech | 726/28 |
| 2009/0288170 | A1* | 11/2009 | Osawa et al. | 726/26 |
| 2010/0034513 | A1 | 2/2010 | Nakano et al. | |

FOREIGN PATENT DOCUMENTS

| | | |
|---|---|---|
| WO | WO 99/62022 | 12/1999 |
| WO | WO 2008/013656 | 1/2008 |

OTHER PUBLICATIONS

Traw, C.B.S. "Protecting Digital Content within the Home," Oct. 2001, Computer, vol. 34, No. 10, pp. 42-47.*

"Efficient Traitor Tracing," http://search.yahoo.com/search;_ylt=A0oGkm6ppQdJXXYB1ltXNyoA?p=IBM+research+technical+paper+efficient+traitor+tracing&y,=Search&fr=&ei=UTF-8, 14 pages, Oct. 4, 2006.

"Advanced Access Content System," http://en.wikipedia.org/wiki/Advanced_Access_Content_System, 7 pages, last modified Jul. 21, 2009.

"Traitor Tracing," http://en.wikipedia.org/wiki/Traitor_tracing, 2 pages, last modified Mar. 31, 2009.

"AACS: Sequence Keys and Tracing," http://freedom-to-tinker.com/blog/felten/aacs-sequence-keys-and-tracing, 6 pages, Jan. 17, 2007.

"An Overview of the Advanced Access Content System (AACS)," http://www.cacr.math.uwaterloo.ca/techreports/2007/cacr2007-25.pdf, 24 pages, 2007.

"Memory Device and Method for Embedding Host-Identification Information into Content," U.S. Appl. No. 12/492,751, Inventors: Jason T. Lin, Alexander Kanarsis, and Joseph E. Halpern, filed Jun. 26, 2009.

International Search Report and Written Opinion for PCT Application Serial No. PCT/US2010/038458, dated Sep. 15, 2010, 10 pages.

Office Action for U.S. Appl. No. 12/492,751, dated Nov. 23, 2011, 13 pages.

Chor et al., "Tracing Traitors", *IEEE Transactions on Information Theory*, vol. 46, No. 3, May 1, 2000, pp. 893-910.

International Search Report and Written Opinion for PCT Application Serial No. PCT/US2009/062735, dated Jan. 25, 2010, 10 pages.

* cited by examiner

File system and data on LBA storage device
▨ FAT, root directory & other file system information
▨ Content to protect with variations LBA used for variation Remapped Memory Sequence 1

Sequence 2

Sequence 3

| Memory Area | Variation Memory Area | |
|---|---|---|
| xu☐Ë-ü,Ñm☐¤q3†r☐ÌÇÜú{SōsåŸ °,@gā¡ô¬å\®qÆq@-ûõ'BI,'öO☐¦;ÉíŒ×Ò>-Ñmü"à ☐ùW☐üo,ÖËĀVòK"Ā☐F ,p☐{'...üAáÙYUõ‹%Ç☐Ì¿ã@ | xu☐Ë-ü,Ñm☐¤q3†r☐ÌÇÜú{SōsåŸ °,@gā¡ô¬å\®qÆq@-ûõ'BI,'öO☐¦;ÉíŒ×Ò>-Ñmü"à ☐ùW☐üo,ÖËĀVòK"Ā☐F ,p☐{'...üAáÙYUõ‹%Ç☐Ì¿ã@ | } Carried over from original |
| hQci/"'ÝsM '☐<Ÿ\Wuö‹☐...ŒòxÎx5Îx‡PšàÍgfaK- ☐c2.UO©-"☐âþ:ôý½ìRÅq☐xuþ,Wì¾)ÑSDñ☐µt☐☐ «"çnéÏ×☐ô☐Œ¬ü☐˜WÄZûê7i2DÓ☐ƒéo¼á@ü☐Ö¼7ã ☐‡fç¶'Ò&Ï'$...Ù&ö¿OA@☐|2°0èW ÷svÇ☐-Ė"Vg,¤...tƒón☐ÈƒbÀžø☐PoŸ☐Ír?☐tõ°Ñã}¿ 0Q''ê}*˜ ⌐4d⌐7|'ü0k Õ$ÓWO¶ŽÈír⌐⌐JÁ⌐ 60GNG^G-aÝ!K¿0⁻R B'â€'⌐Đg9éÁ¢<WŸü☐^éZl‹µ°...\}:ƒøŠuÎÆêKU[☐☐ 0☐☐†|W*A°KG,Ep‡å!Iiw#<×/å☐{P‹Wi¼Ã☐☐Q˘sE Bþ^q]Ÿ˜ô ⌐a⌐7☐Žg,Ú6D>êg¿Ò±µí2æ÷Bšþ P±F2dcŒ{þ☐☐™ ø3Ã2H÷'é☐]Ü\☐Ïq .pO☐ã°=+- â☐ƒi¤"Ù#H¢HØ‹"...Ú@ô®ûÁZÔgFHî!˪%☐ä.£h oö«☐ø¿s³Ã7†☐Ë4g☐zŠ ù☐ °<èe ûæäž9Ç☐¢½ÓÁß | Äê☐eû¡/ÆI«☐☐<Au©x.Vaäi☐ë☐°,¿¼¼pF_☐☐ƒ¶zōÇ' C@-Qāÿm☐¤q °,@gā¡ô¬å\®qÆq@-ûõ'BI,'öO☐¦;ÉíŒ×Ò>-Ñmü"à☐ù W☐üo,ÖËĀVòK"Ā☐F ,p☐{'...üAáÙYUõ‹%Ç☐Ì¿ã@ Òy☐°-â¤f☐"Ÿ,4☐â-&¶ù☐^§R0²r+,ñëÄ'£K☐¬̼- î¬-:☐í(☐Ê<T'Yhkl'˙ƒ☐U☐☐, ☐☐Ý{-☐q'ùlÆk'‹£G¶÷½ÿ £ÿ L™³/ì☐☐8íÁC9Óntɢ"X®î¤Ã °OAŠÄÒ,®<1¬.§g§-ý³☐⁻]åB:0ïldàc⁻Zi</ã{☐RÔÇg| ü☐☐þ£?☐(g$' FHÇāRøÓBÖ|M⁻Çs¬ì☐ZÆá,H☐ÎŽƒž P±F2dcŒ{þ☐☐™ ø3Ã2H÷'é☐]Ü\☐Ïq .pO☐ã°=+- â☐ƒi¤"Ù#H¢HØ‹"...Ú@ô®ûÁZÔgFHî!˪%☐ä.£h oö«☐ø¿s³Ã7†☐Ë4g☐zŠ ù☐ °<èe ûæäž9Ç☐¢½ÓÁß | } Area set with variation<br><br><br>} Carried over from original |

*FIG. 8*

| Provided playlist | Customized playlist |
|---|---|
| A_content | A_content |
| B_content | B_content |
| C_content#0 | C_content#2 |
| D_content | D_content |
| E_content#0 | E_content#0 |
| F_content#0 | F_content#4 |
| G_content | G_content |
| etc | |

*FIG. 9*

STORAGE DEVICE AND METHOD FOR DYNAMIC CONTENT TRACING

CROSS-REFERENCE TO RELATED APPLICATION

This application claims the benefit of U.S. Provisional Application No. 61/110,399, filed Oct. 31, 2008, which is hereby incorporated by reference.

FIELD OF INVENTION

"Traitor tracing" refers to a process of finding the host device (the "traitor") that had a security breach that allowed content played from a storage device to be extracted and copied. The embodiments presented herein reduce the number of hacked content titles needed to identify where the breach took place.

BACKGROUND

In some content protection systems, an optical disc, such as a Blu-ray Disc, stores digital content (e.g., a movie) for playback on a host device (e.g., a Blu-ray Disc player). If the content is pirated, it is desired to be able to identify ("trace") the host device that was responsible for generating the pirated copy. This process is referred to as "traitor tracing." Once the traitor host device is identified, the host device's certificate and key can be revoked, so that the host device will no longer be able to decrypt (and possibly pirate) further content. Usual approaches of "traitor tracing" on optical disks rely on the selection of a variation of a sequence of data. As shown in FIG. 1, stored content (here, a movie) has a plurality of sequences of data (e.g., video frames), with each sequence of data having variation(s) (e.g., duplicate video frames that are nearly identical to one another but have some slight variation). Content variation can take the form of watermarked versions or digitally-edited versions that resist re-encoding.

There are many alternate navigation paths through these variations, and a particular host device is programmed to select a particular variation. That is, some variations will be selected and deciphered by certain host devices, while other variations will be selected and deciphered by other host devices. Accordingly, if a particular content title is pirated, the pirated version can be analyzed to identify what variations were selected. However, because of the limited storage space on a host device and the virtually-unlimited number of possible host devices, multiple host devices may output identical copies of the content, even though the content protection system is designed so that different host devices will not always get identical copies of different titles. Thus, a minimum number of pirated copies of a hacked title is needed to statistically identify where the breach happened.

SUMMARY

Embodiments of the present invention are defined by the claims, and nothing in this section should be taken as a limitation on those claims.

By way of example, the embodiments described below generally relate to a storage device and method for dynamic content tracing. In one embodiment, a storage device stores content having a plurality of sequences of data, each sequence of data having original data and at least one variation of the original data. The storage device receives an identifier of a host device and, for each sequence of data, selects either the original data or one of the at least one variation of the original data based on the identifier of the host device. The storage device then assembles a version of the content from the selections and provides the assembled version of the content to the host device. The assembled version of the content is unique to the host device and therefore can be used to trace the assembled version of the content back to the host device.

Other embodiments are provided, and each of the embodiments can be used alone or together in combination. Various embodiments will now be described with reference to the attached drawings.

BRIEF DESCRIPTION OF THE DRAWINGS

FIG. 8 is an example of content variation with carry over data of an embodiment.

FIG. 9 is an example of a playlist of an embodiment.

DETAILED DESCRIPTION OF THE PRESENTLY PREFERRED EMBODIMENTS

Introduction

The following embodiments relate to a storage device and method for dynamic content tracing. In this embodiment, the storage device is operative to provide dynamic content tracing for the content it stores in its memory. In general, the content has a plurality of sequences of data, each sequence of data having original data and at least one variation of the original data. Instead of relying upon a host device to provide a unique version of the content that can be used to trace a traitor host device, the storage device selects either the original data or one of the at least one variation of the original data for each sequence of data based on the identifier of the host device. As mentioned in the background section above, when host devices are responsible for making such selections, multiple host devices may output identical copies of the content, which requires the presence of a minimum number of hacked content titles in order to statistically identify where the breach took place. However, if a storage device makes the selections, the number of hacked content titles needed to identify where the breach took place can be reduced to one.

Before turning to a discussion of dynamic content tracing, an exemplary storage device will be described.

Exemplary Storage Device

Figure 1:
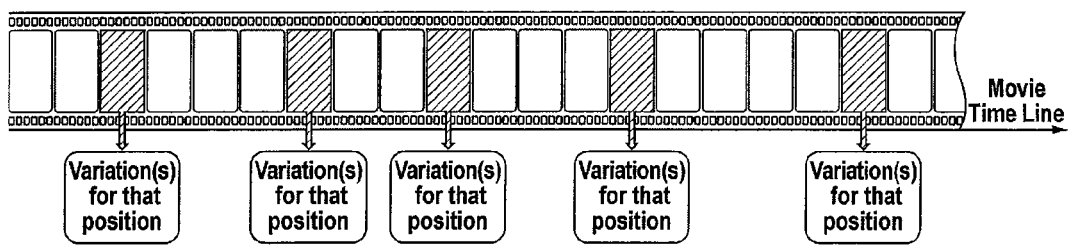
FIG. 1 is an illustration of variations of a sequence of content of the prior art.
Figure 2:
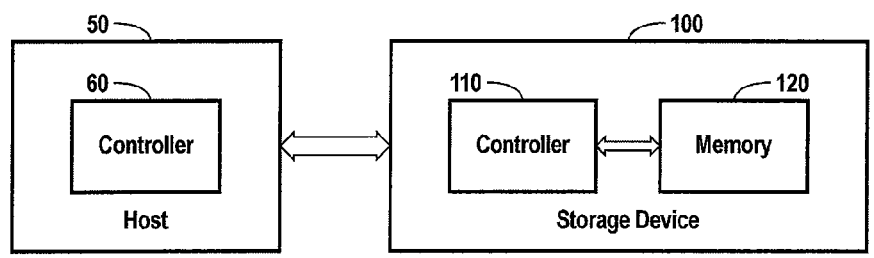
FIG. 2 is an illustration of a host device and a storage device of an embodiment.

Turning now to the drawings, FIG. 2 is a block diagram of a host device 50 and a storage device 100 of an embodiment.

As shown in FIG. 2, the storage device 100 comprises a controller 110 and a memory 120 operative to store content. "Content" can take any suitable form, such as but not limited to, digital video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), a video game or other software, and a hybrid multi-media presentation of two or more of these forms.

The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. The controller 110 can also be implemented as part of the memory 120 control logic.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. Although shown as single components in FIG. 2, the controller 110 and/or memory 120 can be implemented with several components. Further, the storage device 100 can contain other components, which are not shown in FIG. 2 to simplify the drawings. In one embodiment, the storage device 100 takes the form of a handheld, removable memory card (e.g., a flash storage card); however, the storage device 100 can take other forms, such as, but not limited to, a solid-state drive and a universal serial bus (USB) device.

As shown in FIG. 2, the storage device 100 is in communication with the host device 50 having a controller 60. As used herein, the phrase "in communication with" means directly in communication with or indirectly in communication with through one or more components, which may or may not be shown or described herein. The host device 50 can take any suitable form, such as, but not limited to, a dedicated content player, a mobile phone, a personal computer (PC), a game device, a personal digital assistant (PDA), a kiosk, and a TV system. Preferably, the storage device 100 is removably connected to the host device 50, so a user can use the storage device 100 with a variety of hosts.

Dynamic Content Tracing

As mentioned above, in these embodiments, the storage device is active and enables dynamic and deterministic content tracing by providing a version of content that is specific to the host device (i.e., the Requestor). The entity accessing the content ("Requestor") is set with a Requestor ID (or, more generally, an "identifier"), which will be used to identify where the breach happen. The Requestor ID could be for a given entity, an entity model, a family of devices, etc. For example, to uniquely identify 1,000 billion ($10^{12}$) different entities, the content preferably has a minimum of 40 sequences with at least one variation each ($2^{40} > 10^{12}$).

The Requestor ID can take any form. For example, it could be constructed from a creation date and a daily serial number. Also, the Requestor ID can be from a certificate used to authenticate the host device to the storage device using, for example, public key infrastructure (PKI) authentication. Using PKI authentication for the identification adds the benefits of time expiration and revocation to the Requestor ID, as the number of active Requestors that could be identified will not grow forever. With PKI authentication, the Requestor ID can be tied to a certificate ID of an authenticated entity, which would be subject to time expiration and revocation as any other certificate ID.

The Requestor ID can also have any number of digits. In one embodiment, the number of digits required to represent the (largest) Requestor ID determines the minimum number of sequences of the content that should have variations. The mathematical base used to represent the Requestor ID implies the number of variations required for a given sequence. For example, when the Requestor ID is represented in base N, then N−1 variations are created for each of the sequences with variations. The minimum number of sequences depends on the number of digits used to represent the largest Requestor ID. Choosing a mathematical base can be necessary when the number of sequences that can be set with variations is limited by content size, content duration, and content type, for example.

It should be noted that when the number of sequences is reduced resulting in a larger number of variations per sequence, the total number of variations is increased, and, thus, so is the need for extra storage. For example, 1,000 billion entities can be uniquely represented with 40 digits in base-two with one variation per digit, resulting in 40 variations. When represented in base 10, a minimum of 13 digits are necessary with nine variations per digits, resulting in a total of 117 variations.

Selecting the Variations

Figure 3:
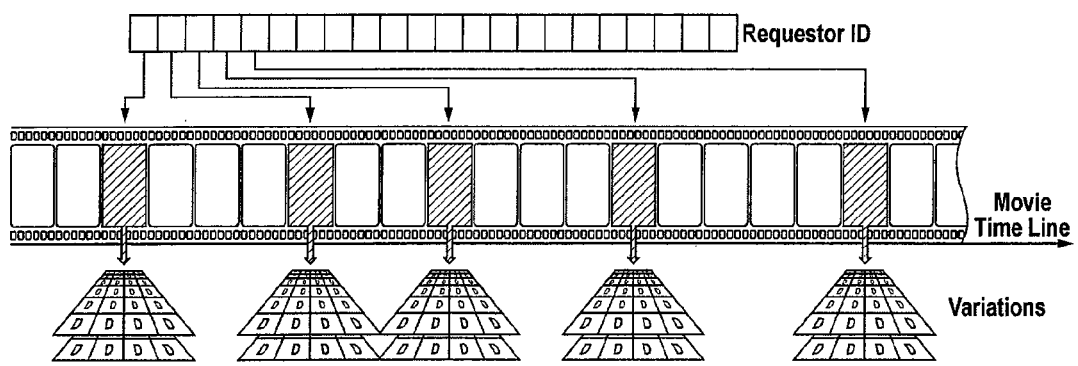
FIG. 3 is an illustration of variations of a sequence of content of an embodiment.

In this embodiment, each sequence with variation(s) is matched with a digit position of the Requestor ID, and the Requestor ID digit value is used as an index to select the variation for that Requestor. This is shown diagrammatically in FIG. 3. (Of course, other techniques can be used to select variations(s) based on the Requestor ID.) As a result, a unique copy/version of the content is assembled according to the Requestor ID. Because the content copy uniquely identifies the source Requestor, the content copy, if pirated, can be analyzed to evaluate which sequences set with variations were used to identify the "traitor" source Requestor and revoke its future access to content.

As an example of how the variations can be selected, consider, for example, the situation in which the certificate ID of an authenticated entity is represented in binary as 1000 1100 1101 1010 1011. This is the Requestor ID in base-two. In this example, considering that the largest Requestor ID would also have 20 digits, at least 20 sequences should have variations. In this embodiment, a variation is used according to the value of the Requestor ID digit (e.g. when 1), and the original is used otherwise (e.g. when 0). The same Requestor ID represented in base-eight would be 2146653. In that case, seven variations can be available for a given sequence, and the Requestor ID digit value would specify which one to use for the given sequence. The Requestor ID of zero can be reserved. As such, all content will have at least one variation. Reserving a Requestor ID of zero allows one to identify a brute force attack, as, preferably, no Requestor should ever receive such version of the content (i.e., no variation means brute force attack).

It should be noted that a given piece of content can have enough sequences with variations to carry the Requestor ID multiple times. In that case, the Requestor ID digits can be used in a loop to cover all the different sequences. This would make it particularly more difficult for hackers to remove the tracing information.

Extra information can be used to specify the mathematical base in which the Requestor ID is represented. That information can be set on a storage device or provided from the host device. For example, the information can be extracted during the authentication process (e.g., the information can be provided as part of the Requestor certificate used for authentication or provided through a separate command), or the information can be attached to a given piece of content and provided to the storage before such piece of content is accessed (e.g., by using a special command sent to the storage device).

Storing the Variations

As this content protection system is based on injecting variations according to the Requestor ID, it may be preferred to protect the variations from external manipulation, such as copy, update, rename, etc. As such, the variations can be stored in a different memory space, such as a reserved area on the storage device. For example, the variations can be stored in reserved partitions of a TrustedFlash™ memory card. The variations can also be protected with additional cryptography. In any event, it may be preferred to allow updates or additions to the variations over the lifetime of the storage device as long as enough memory is available or has been reserved to store the updated set.

Applying Variations Memory Using Block Addresses

In one embodiment, a memory remapping approach is used to implement the dynamic content tracing process. Memory remapping is particularly convenient for storage devices, such as Flash storage devices, that use a logical block address (LBA) to physical block address (PBA) table. With this memory remapping approach, a temporary LBA to PBA table would be created and used according to the Requestor ID. (As an alternative to remapping, the storage device can make a copy of the variations from one memory location to another according to the Requestor ID. However, that method may not permit the system to leverage a specific Requestor ID of zero as a way to identify a brute force attack on the original content, as discussed above).

In the technique where remapping is performed using a temporary LBA to PBA table, once a Requestor ID is received, the storage device temporarily remaps some memory loaded with content variations to specified target locations according to the Requestor ID. The locations can be specified in various ways, such as with a mathematic function of using a variation allocation table (VAT), as discussed below. Such location information or parameters are preferably set before the content is accessed; for example, they can be preloaded with the content and its variations.

Figure 4A:
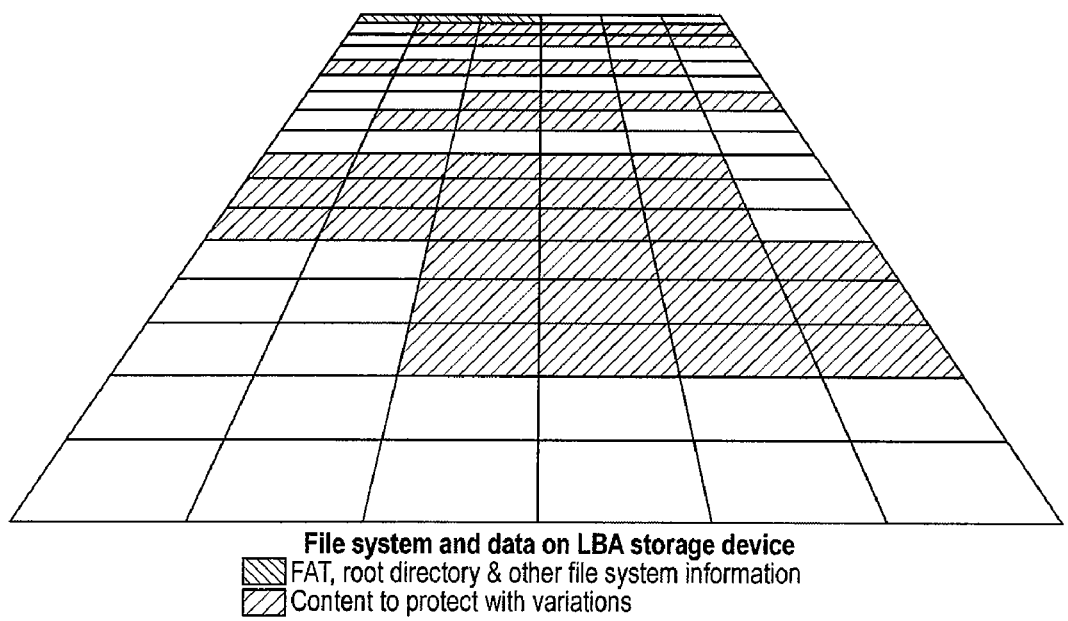
FIG. 4A is an illustration of file system information and data on a logical block addresses of a storage device of an embodiment.
Figure 4B:
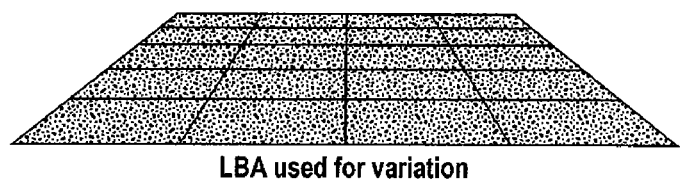
FIG. 4B is an illustration of logical block addresses used for variations of an embodiment.
Figure 4C:
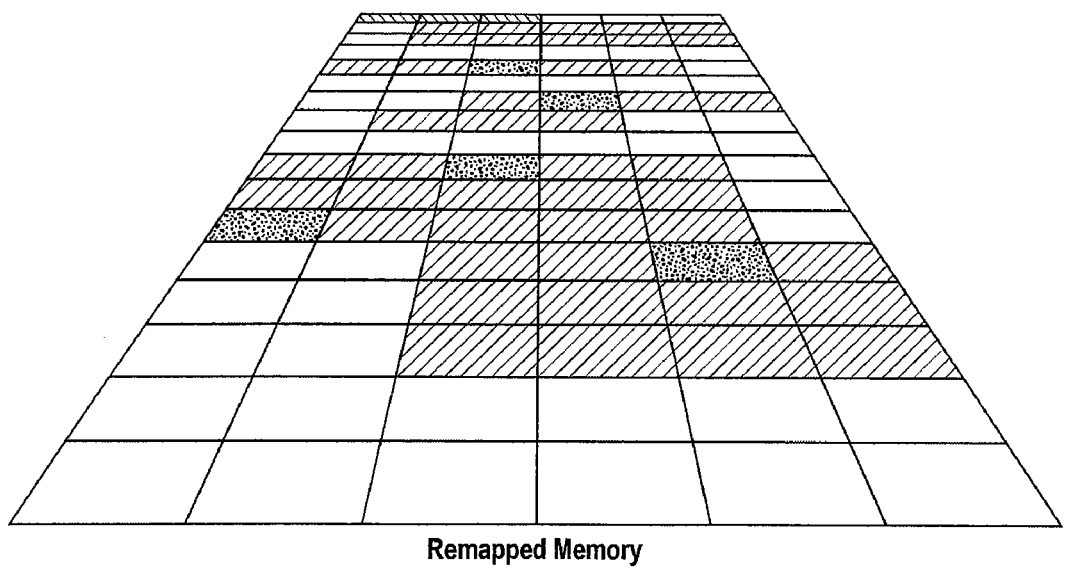
FIG. 4C is an illustration of a remapped memory of an embodiment.

This technique is illustrated in FIGS. 4A-4C. FIG. 4A shows file system information (e.g., the file allocation table (FAT) and root directory) and data stored in the logical block address (LBA) space of the memory device, while FIG. 4B shows blocks of variation data in the LBA space. After identification of the Requestor, a temporary LBA-to-PBA table is created, and blocks of variation data are injected into the temporary LBA-to-PBA table (FIG. 4C). The temporary LBA-to-PBA table is then used instead of the actual LBA-to-PBA table.

One advantage of using a temporary LBA-to-PBA table is that it maximizes backwards compatibility. Also, it conceals from the host file system the fact that the dynamic content tracing system is in place, as the Requestor sees content according to the underlying copy protection system (if any). The Requestor also does not know where the variations are injected, as the only way to discover that a storage device uses dynamic content tracing would be to compare the versions of the content from the same storage device, accessed with different Requestor ID.

Creating the Temporary LBA-to-PBA Table

The following paragraphs provide an example of how a temporary LBA-to-PBA table can be created using a variation allocation table (VAT). This example assumes a contiguous memory space for the VAT in order to simplify the mathematic functions used for the remapping. Of course, other implementations are possible.

Figure 5:
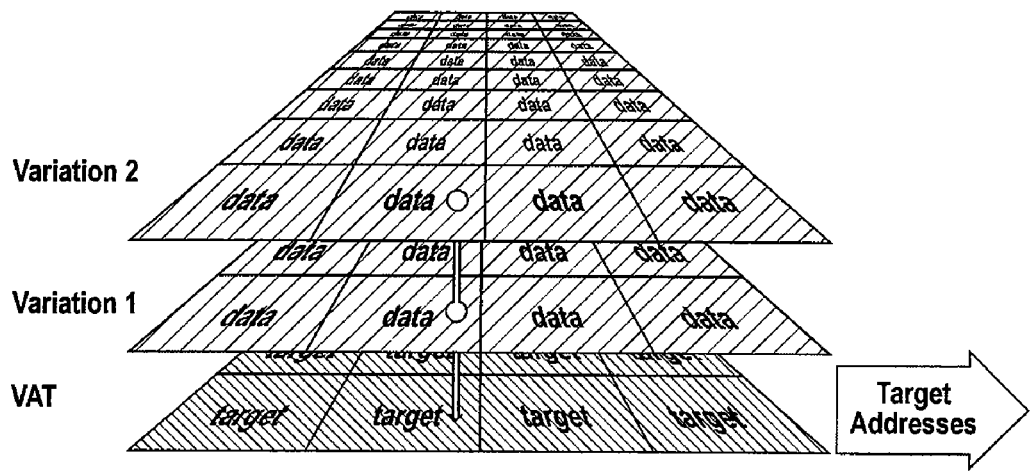
FIG. 5 is an illustration of a variation allocation table (VAT) of an embodiment.

As mentioned above, in this example, a variation allocation table (VAT) is used to identify the logical block addresses that should be updated with variation data. The cells in the VAT contain the target addresses to remap to, and each cell is associated with a data block of the variations. The correct variation to use is selected according to the Requestor ID digit value. This is shown diagrammatically in FIG. 5. Each VAT is associated with a sequence associated with a digit position. Similar to a file system file allocation table (FAT), the size of the VAT can be smaller than the size of one variation, as the VAT cell stores an address and a variation block in memory stores the actual data.

Figure 6:
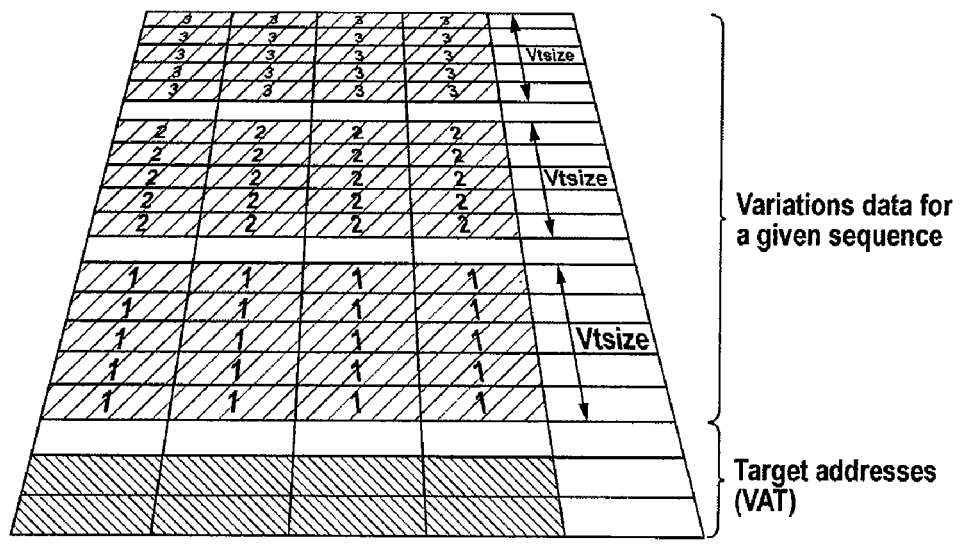
FIG. 6 is an illustration of variations data of an embodiment.

Assuming contiguous memory space for the VAT and all the variations, it is quite easy to perform the remapping and create the temporary LBA-to-PBA table. This is shown diagrammatically in FIG. 6. Here, the number of variations is the same for all sequences: N−1 for representation in base N. The offset from the VAT is calculated from the Requestor ID digit value (Dvalue) and the size of the sequence (and variation) Vtsize: offset=Dvalue×Vtsize. When all the sequences are of identical sizes, all VAT cell are of identical sizes (Svat). The source data offset for a given sequence at position P (starting from 0 for first position) is: Source data offset=Svat+Dvalue×Vtsize+P×(Svat+(N−1)×Vtsize)).

Figure 7A:
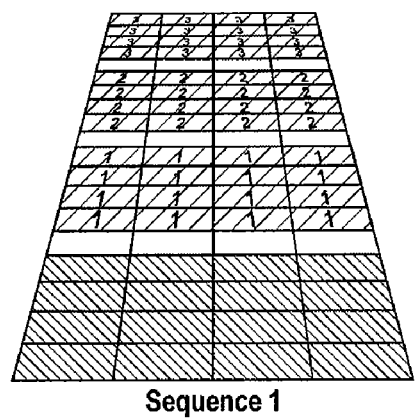
FIGS. 7A, 7B, and 7C are illustrations of variation sequences of an embodiment.
Figure 7B:
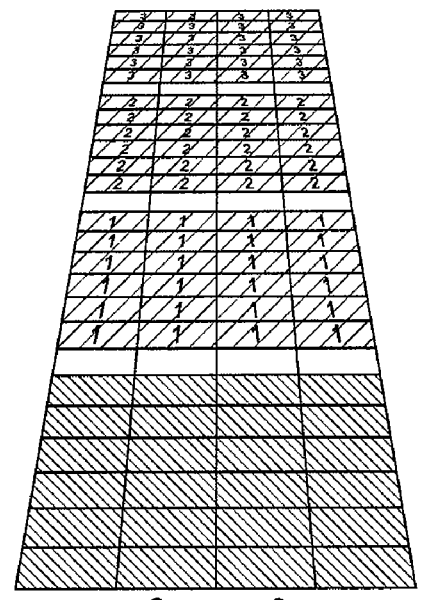
Figure 7C:
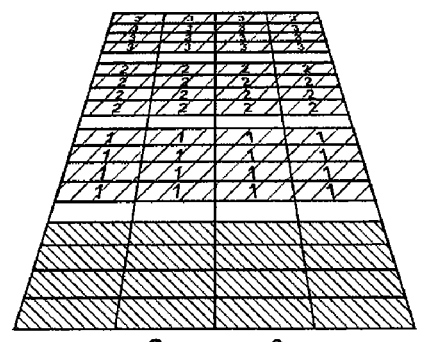

When the sequences are of different sizes, accesses to the VAT might be of different sizes unless the VAT size for the largest sequence is use by default. When VATs have different sizes, the use of a Tag Length Value (TLV) would permit easy navigation from one sequence to another one: VAT length>VAT data>Variation length>variations data>VAT length>VAT data>etc. This is shown in the three sequences of FIGS. 7A-7C. It should be noted that the variations may apply to one or multiple files. These embodiments also apply to solutions that are not using a file system. Also, the LBA-to-PBA table is only aware of block addresses and does not require knowledge of files.

Creating Memory Variations

As mentioned above, variations in a sequence of data are used to create a unique version of content that can be used to later identify a host device that rendered the data. The variations can take any suitable form and be created in any suitable manner. For example, one embodiment takes advantage of the fact that some content formats and encoding schemes may result in content not being aligned with a memory address boundary. In such situations, as shown in FIG. 8, a variation can be created by carrying over some of the original version of data to make sure the insertion works smoothly.

Multiple Requestors

By design, in this embodiment, remapping occurs according to the last Requestor ID received. One limitation is that it is not possible for two Requestors to access the same piece of content at the same time. However, this is not an issue as the underlying copy protection can limit use to one authenticated Requestor at a time. The other Requestor will not be able to use or access the content. Yet, it is possible for two Requestors to access different pieces of content at the same time on the same storage device if the access is tied to the piece of content itself. For example, information about the account used to login in can be tied to a given piece of content and its set of variations. In some other cases, the Requestor ID can be used instead. It is also possible for the Requestor ID to specify ahead of time what content will be accessed. In the case of multiple Requestors accessing different files, multiple set of VAT and variations can be tied to the content.

Applying Variations Files on a File-Aware Storage Device

In the example discussed above, the storage device was only aware of block addresses and did not have knowledge of files. However, these embodiments can also be applied to storage devices that have knowledge of files (i.e., "file-aware" storage devices). In general, a file aware storage device manages a "variation playlist" and injects the variations in the file according to the host identifier. The file-aware storage device can inject a variation at the right time when the file position is reached. Alternatively, the file-aware storage device can pipe the data from the variation file instead of the actual file. In that case, it is considered that a title would have multiple files (e.g., when content comes in multiple files and selected files have variations). The variations can be in the form of files as well; however, having the variations as files is not a requirement. It is preferred, however, to know when to use the variation data instead of actual sequence file data. In order to reduce the complexity, playback can be done through a playlist or using a schema that defines a playback order. It is assumed that the storage device knows at least what files have been set with variations. It is also expected that the storage device can stream out the content to the Requestor. The stream can be customized by the storage device according to the Requestor ID and can be done by one or more onboard applications that know when a variation should be use instead of original data and that can select and steam the correct variation according to the Requestor ID instead of original content.

One option for the injection is for the storage device to start by updating or creating a playlist according to the Requestor ID. Typically, the original playlist for a given piece of content would be provided to the storage device. It can be set, for example, when the content and its variations are loaded. Information used to determine where to inject a variation can be part of the provided playlist as well.

The Requestor ID digit can be used as an index for the file name. In that case, a variation can be named as the original content with the addition of a number. For example, Somefile-0 can be the original, and somefile-1, somefile-2, etc. can be the variations. FIG. 9 is an illustration of a playlist, wherein the Requestor ID is 2, 0, 4, etc., and the content playback order is A, B, C, D, E, F, G, etc.

As earlier, the minimum number of variation files for a sequence file depends on the mathematical base to represent the Requestor ID. For a representation in base-N, (N−1) variations should preferably be available for a given sequence. The number of sequences set with variations depends on the number of digits required to represent the largest Requestor ID in the chosen mathematical base.

As pointed out earlier, the variations can be stored in a memory space protected from external manipulation. As the system relies on injecting the correct file, renaming or replacing the file would fail the tracing mechanism.

It should be noted that the onboard application streaming the content can be combined with the Requestor credentials to gain access to the content and its variations. For example, credentials from both can be required to gain access to the variations or the content.

Content streaming may require using special command(s) or protocols, such as those defined by TrustedFlash™, the Advanced Security SD (ASSD) specification, etc. Content streaming may also use TCP/IP transport and use an Internet streaming protocol. Leveraging such special commands or protocols comes with the main advantage that multiple Requestors can access the same content at a given time and would both receive unique copies, thus keeping the dynamic content tracing efficient. For example, embedding an ID (e.g., a session ID or a Requestor ID) in the data request (e.g., read data or read stream) allows the storage device to know who the Requestor is for the data; thus, the storage device can customize the stream accordingly by selecting the data from the correct variation, if any, for that request.

Some other methods can copy the variations after the Requestor ID is received, thus allowing the use of classic file system access. However, the host may have to refresh its cache to see the changes. It also means that only the version of the content created for the last Requestor ID received might be available at a given time. Also, it should be noted that the streaming option is not specific to a storage device. That is, these embodiments can be used to select variations to any device that can stream, such as those used for video-on-demand (VOD) and other streaming services.

Advantages and Alternatives

There are several advantages associated with these embodiments. As mentioned in the background section above, when a host device is responsible for selecting variations to create unique, traceable content, a minimum number of a hacked title may be required to statistically identify where the breach happened because of the limited storage space on a host device and the virtually-unlimited number of possible host devices. With these embodiments, the storage device performs the variation selection, which reduces the number of hacked content titles needed to identify where the breach took place. This provides value (e.g., in the form of money saving for content providers) over the prior host-driven techniques used with optical media because a single leak can identify the hacked player. These embodiments also allow identifying a brute force attack on the content, as a brute-force pirated copy will be without any variations outside of the original set for this type of storage device. Also, these embodiments are transparent to the Requestor, and there is no indication to the outside world if and when the dynamic content tracing system is active on a storage device. Further, because the storage device is active storage and supports PKI authentication, access to a given host device can expire, which prevents the total number of hosts from growing forever. Additionally, when authentication to the storage device is required to access the content (e.g., as part of the underlying copy protection method), it is possible to leverage classic file system access, as a single entity can be given access at a given time.

There are several alternatives that can be used with these embodiments. For example, because downloading may not provide access to logical block addresses and because logical block addresses do not permit backup-restore functionality (because logical block addresses can change), the customized content title (i.e., the one with variations) can be a file. In this embodiment, the Requestor authenticates and reads content from a file that is populated (i.e., "filled in") after the authentication happens. The file can be a virtual file, so the actual storage capacity is not necessarily needed.

As another alternative, watermarking can be combined with using variations. This alternative addresses the possibility that multiple Requestors can use a mix of content when creating the hacked title to somehow make the content point to another Requestor than the ones used. To address this, watermarking can be used for each storage device, so that the content title on each storage device is watermarked individually. In doing so, one can detect if the hacked title has been made from a mix. In this method, all parts of the content (and, more specifically, the variations) are preferably marked. In yet another alternative, watermarking is generated on-the-fly according to the Requestor ID, thus making it easy to find the use of a mix but also easy to detect the actual Requestor IDs that were used to create it. Finally, it should be noted that the variations can be received after the storage device is shipped. For example, the variations for a given Requestor can be received after the content is unlocked, as in the case of video-on-demand (VOD).

Conclusion

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for dynamic content tracing, the method comprising:
    performing the following in a storage device, wherein the storage device stores content having a plurality of sequences of data, each sequence of data having original data and at least one variation of the original data:
        receiving an identifier of a host device in communication with the storage device;
        for each sequence of data, selecting either the original data or one of the at least one variation of the original data based on the identifier of the host device;
        creating a temporary logical-block-address-to-physical-block-address table, in which the selections are mapped to target locations specified by the identifier from the host device;
        assembling a version of the content from the selections, wherein the assembled version of the content is unique to the host device and therefore can be used to trace the assembled version of the content back to the host device; and
        providing the assembled version of the content to the host device.

2. The method of claim 1, wherein the host device is not aware that the provided assembled version of the content has variations.

3. The method of claim 1, wherein the identifier of the host device is part of a certificate received from the host device to authenticate the host device.

4. The method of claim 1, wherein the identifier comprises N digits, wherein the plurality of sequences of data comprises N sequences of data, and wherein a value of each digit identifies which of the original data or one of the at least one variation of the original data should be selected for the sequence of data associated with that digit.

5. The method of claim 1, wherein the identifier comprises N digits, wherein the plurality of sequences of data comprises a plurality of sets of N sequences of data, and wherein a value of each digit identifies which of the original data or one of the at least one variation of the original data should be selected for the sequences of data associated with that digit.

6. The method of claim 1, wherein the storage device stores information specifying a mathematical base of the identifier.

7. The method of claim 1 further comprising receiving information from the host device that specifies a mathematical base of the identifier.

8. The method of claim 1, wherein the at least one variation of the original data and the original data are stored in different memory spaces in the storage device.

9. The method of claim 1, wherein the target locations are identified by a variation allocation table (VAT).

10. The method of claim 1, wherein the at least one variation comprises data carried over from the original data.

11. The method of claim 1 further comprising providing the host device with a playlist to play the assembled version of the content.

12. The method of claim 1, wherein the assembled version of the content is read from a file that is populated after the host device has been authenticated.

13. A storage device comprising:
    a memory operative to store content having a plurality of sequences of data, each sequence of data having original data and at least one variation of the original data; and
    a controller in communication with the memory, wherein the controller is configured to:
        receive an identifier of a host device in communication with the storage device;
        for each sequence of data, select either the original data or one of the at least one variation of the original data based on the identifier of the host device;
        create a temporary logical-block-address-to-physical-block-address table, in which the selections are mapped to target locations specified by the identifier from the host device;
        assemble a version of the content from the selections, wherein the assembled version of the content is unique to the host device and therefore can be used to trace the assembled version of the content back to the host device; and
        provide the assembled version of the content to the host device.

14. The storage device of claim 13, wherein the host device is not aware that the provided assembled version of the content has variations.

15. The storage device of claim 13, wherein the identifier of the host device is part of a certificate received from the host device to authenticate the host device.

16. The storage device of claim 13, wherein the identifier comprises N digits, wherein the plurality of sequences of data comprises N sequences of data, and wherein a value of each digit identifies which of the original data or one of the at least one variation of the original data should be selected for the sequence of data associated with that digit.

17. The storage device of claim 13, wherein the identifier comprises N digits, wherein the plurality of sequences of data comprises a plurality of sets of N sequences of data, and wherein a value of each digit identifies which of the original data or one of the at least one variation of the original data should be selected for the sequences of data associated with that digit.

18. The storage device of claim 13, wherein the storage device stores information specifying a mathematical base of the identifier.

19. The storage device of claim 13, wherein the controller is further operative to receive information from the host device that specifies a mathematical base of the identifier.

20. The storage device of claim 13, wherein the at least one variation of the original data and the original data are stored in different memory spaces in the storage device.

21. The storage device of claim 13, wherein the target locations are identified by a variation allocation table (VAT).

22. The storage device of claim 13, wherein the at least one variation comprises data carried over from the original data.

23. The storage device of claim 13 wherein the controller is further operative to provide the host device with a playlist to play the assembled version of the content.

24. The storage device of claim 13, wherein the assembled version of the content is read from a file that is populated after the host device has been authenticated.

25. The storage device of claim 13, wherein the storage device is a handheld memory card that is removably connectable with the host device.

26. The method of claim 1, wherein the storage device is a handheld memory card that is removably connectable with the host device.

* * * * *